United States Patent Office 3,519,686
Patented July 7, 1970

3,519,686
1-(4-CHLOROPHENYL)-MERCAPTO-2-PROPYL-AMINE AND THE SALTS THEREOF
Mohan Damodaran Nair, Goregaon, India, assignor to Ciba Limited, Basel, Switzerland, a Swiss company
No Drawing. Filed May 23, 1967, Ser. No. 640,494
Claims priority, application Switzerland, June 3, 1966, 8,084/66
Int. Cl. C07c 149/42
U.S. Cl. 260—570.5
4 Claims

ABSTRACT OF THE DISCLOSURE

The 1-(4-chloro-phenyl)-mercapto-2-propylamine of the formula

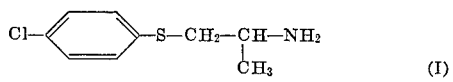

(I)

and salts thereof show anti-depressive properties.

SUMMARY OF THE INVENTION

The present invention has for its object the provision of the new 1-(4-chloro-phenyl)-mercapto-2-propylamine of the above Formula I and salts thereof, as well as process for their manufacture and pharmaceutical preparations containing same. These compounds are useful as specific antidepressants, for example, in the treatment of both, psychotic and neurotic depressions and as mood elevators.

DESCRIPTION

The compounds of the present invention have valuable pharmacological properties. Thus, in experiments with animals, for example mice, they antagonize mescaline induced motor stimulation, reverse reserpine induced hypothermia and respond positively to the DOPA test (Federation Proceedings, 1964, 23, 198). The new compounds, apart from being useful as antidepressants as indicated above, are also useful in handling cases of endogenous and atypical depressions. At the same time, the compounds of the present invention completely or almost completely lack the known side-effects of stimulants, such as stimulation of the motor activity, loss of muscular coordination and effects on spinal reflexes, as could be established by experiments, for example, with mice, rats, cats, rabbits and monkeys as experimental animals. The 1-(4-chlorophenyl)-mercapto-2-propylamine and its salts show specific antidepressive effects at daily doses of about 0.05 g. to about 0.15 g.

The compounds of the present invention are prepared in a manner which is in itself known, for example, by reacting p-chloro-thiophenol of the Formula II

(II)

or a salt thereof with 1,2-propyleneimine or by converting $R_0$ or $R^0$ in a compound of formula

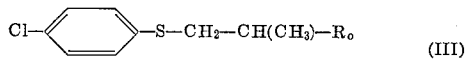

(III)

or in a compound of formula

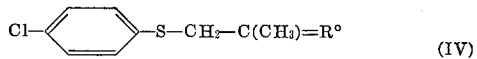

(IV)

in which $R_0$ denotes a residue which can be converted into an amino group and $R^0$ denotes a residue which can be converted into an amino group with simultaneous saturation of the —C=$R^0$— double bond, into the amino group.

The reaction of the p-chlorothiophenol with the 1,2-propyleneimine is carried out either in the absence of a solvent, or, preferably, in the presence of a diluent, such as a lower alkanol, for example, methanol, or of a mixture of solvents. The process is primarily carried out, at an elevated temperature, in a closed vessel, and/or in an inert gas atmosphere. The 1,2-propyleneimine may also be produced in situ, for example, from a reactive esterified 2-amino-propanol, such as a 2-aminopropyl halide, for example, the chloride, and may therefore also be used in the form of such an intermediate product.

A residue $R_0$ capable of being converted to an amino group, is preferably a residue convertible to an amino group by hydrolysis, hydrazinolysis, hydrogenolysis or reduction, as well as treatment with an acid. Such residues include, amongst others, an acylamino group, in which acyl represents the residue of an organic carboxylic or an organic sulfonic acid. Suitable acylamino groups are, for example, formylamino of phthalimido groups, as well as acylamino residues, in which acyl denotes the residue of a carbonic or thiocarbonic acid compound, e.g., carbethoxyamino, trichlorethoxycarbonylamino, tert.-butyloxycarbonylamino or carbobenzoxyamino, as well as ureido or thioureido groups. Acylamino groups may be converted to the free amino group by hydrolysis, for example, with an acid reagent, such as an aqueous mineral acid, for example, hydrochloric acid, or by hydrazinolysis (for example, in the case of a phthalimido group), by reduction, for example, with chemical reducing agents such as zinc and aqueous acetic acid (for example, in the case of a 2,2,2-trichlorethoxycarbonylamino group) or by treatment with an acid, such as trifluoracetic acid (for example, in the case of a tert.-butyloxycarbonylamino group).

Acylamino groups are also N-residues of the anhydro forms of carbamic or thiocarbamic acid, i.e., the isocyanato or isothiocyanato groups; such residues may also be converted to the amino group by hydrolysis, for example, with water.

Other residues $R_0$, which are also hydrolytically convertible to the amino group, especially by means of acid hydrolysing reagents, are ylidenamino groups, especially alkylidenamino, cycloalkylidenamino or aralkylidenamino groups; such residues may, for example, be converted, to the amino groups by means of acid reagents, such as aqueous or alcoholic hydrochloric acid.

Further groups $R_0$ are reactive esterified hydroxyl groups, especially halogen atoms such as chlorine, bromine or iodine atoms, or organic sulphonyloxy groups, such as methylsulfonyloxy, phenylsulfonyloxy, p-tolylsulfonyloxy, p-bromophenylsulfonyloxy or m-nitrophenylsulfonyloxy groups. These are converted to the amino group by treatment with ammonia or with a reagent furnishing ammonia, such as hexamethylene tetramine.

Furthermore, a group $R_0$ which can be converted to an amino group may also denote a nitro or nitroso group; these groups can be converted to the desired amino group by reduction, especially with nascent hydrogen or, preferably, by means of a hydride reducing agent, such as lithium aluminum hydride.

The imino group is a residue $R^0$ which can be converted into the amino group with simultaneous saturation of the —C=$R^0$ double bond in the starting material of Formula IV; it may be reductively converted to the amino group, for example, like the nitro or nitroso group.

In the process of the invention, the reactions are carried out in a manner which is in itself known, in the presence or absence of solvents and/or catalysts and/or condensation agents, and, where necessary, with cooling or heating, in a closed vessel under pressure, and/or in an inert gas atmosphere, such as nitrogen.

Depending on the reaction conditions the new compound of Formula I is obtained in the free form or in the form of its salts. The latter are acid addition salts, especially the pharmaceutically usable acid addition salts, for example, addition salts with inorganic acids, such as hydrochloric, hydrobromic, nitric, sulfuric or phosphoric acids, but also with organic acids, such as organic carboxylic acids, for example, acetic, propionic, glycollic, malonic, succinic, maleic, hydroxymaleic, dihydroxymaleic, fumaric, malic, tartaric, citric, benzoic, cinnamic, mandelic, salicyclic, 4-amino-salcylic, 2-phenoxybenzoic, 2-acetoxybenzoic, embonic, glucuronic, nicotinic or isonicotinic acids, or organic sulfonic acids, e.g., methanesulfonic, ethanesulfonic, 2-hydroxyethanesulfonic, 1,2-ethanedisulfonic, benzenesulfonic, p-toluenesulfonic, 2-naphthalenesulfonic or N-cyclohexylsulfamic acids, as well as ascorbic acid. These and other acid addition salts may also be used as intermediate products, for example, in purifying the free compound or in the preparation of other salts, or be used for identification purposes. Salts which are particularly suited to the latter purpose are, for example, those with perchloric acid or with acid organic nitro compounds, for example, picric, picrolonic or flavianic acids, or with metallic complex acids, for example, phosphotungstic, phosphomolybdic, chloroplatinic or Reinecke acid.

The salts obtained may be converted to the free compound, for example, by treatment with a base, such as an alkali metal or alkaline earth metal hydroxide or carbonate, or with ammonia, or with a suitable ion exchanger.

The salts obtained may also be converted into other salts, for example, by treatment with an ion exchanger or by reaction of a salt of an inorganic acid with a metal salt, for example, a sodium, barium or silver salt of an acid in a suitable solvent, in which the resulting inorganic compound is insoluble.

The free compound may be converted to its acid addition salts, for example, by treatment with acids, such as those mentioned above, or a solution thereof, for example, of a solution of the base in a suitable inert solvent or solvent mixture, or by treatment with a suitable ion exchanger. The salts may also be obtained in the form of their hydrates or may contain solvent of crystallization. In view of the close relationship between the free compound and the compound in the form of its salts, whenever the free compound or the salts are referred to in this context, the corresponding salts and the free compound, respectively, are also intended, provided such is possible or aproriate under the circumstances.

A resulting mixture of isomers may be separated into the individual isomers by methods known in themselves. Thus, a resulting racemate may be resolved into the optically active d- and l-forms by crystallisation from an optically active solvent or by treatment of the racemic compound with an optically active form of an acid which contains an asymmetric carbon atom, preferably in the presence of a suitable solvent. Particularly suitable optically active forms of acids are d-tartaric and l-tartaric acids, as well as the optically active forms of malic acid, mandelic acid, camphor-10-sulphonic acid or quinic acid. Resulting diastereoisomeric salts may be converted into other salts or into the free, optically active base, and the latter may be converted to its acid addition salts by the methods described above; the isomer with the more pronounced pharmacological effects is preferably isolated.

The invention also relates to modifications of the above process according to which an intermediate product resulting at any one stage of the process is used as the starting material and the remaining process stages are carried out, or the process is interrupted at any stage, or a starting material is formed under the conditions of the reaction or is used in the form of a derivative, such as, for example, a salt thereof.

The invention also comprises new compounds produced as intermediate products.

The starting materials are known or may be obtained by methods which are in themselves known. Thus, for example, a compound of Formula III, in which $R_0$ denotes a formylamino group may be obtained 4-chlorophenylmercapto-acetone by treatment with formamide, if necessary, in the presence of formic acid, according to the so-called Leuckart reaction [Organic Reactions, 5, 301 (Wiley, 1949)]. A compound, in which $R_0$ represents phthalimido group is, for example, produced by treating an appropriate compound, in which $R_0$ denotes a halogen atom, for example, a bromine atom, with an alkali metal phthalimide, especially potassium phthalimide, or the thiophenol of the Formula II with a N-(2-halogenopropyl)-phthalimide, halogeno being primarily bromo. Compounds of Formula III, in which $R_0$ denotes the N-residue of a carbamic or thiocarbamic acid or, especially, an isocyanato or isothiocyanato group, are, for example, produced by the Hofmann degradation [Organic Reactions, 3, 267 (Wiley, 1946)] from the amide of the carboxylic acid of formula

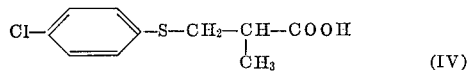

by alkaline bromination, or by the Curtius degradation [Organic Reactions, 3, 337 (Wiley, 1946)] from an ester of this acid via the hydrazide and the azide of the acid of Formula IV. Compounds, in which $R_0$ represents a reactive esterified hydroxyl group, may, for example, be obtained by reacting the thiophenol of Formula II with 1,2-propylene oxide or with a reagent furnishing the latter, such as a 2-hydroxypropyl halide, for example, the chloride, followed by esterification, for example, by means of an inorganic or organic acid halide, such as thionyl chloride or p-toluene sulfonyl chloride. A starting material of Formula III, in which $R_0$ denotes a nitro group group, may, for example, be produced adding 2-nitropropene to the thiophenol of Formula II.

The compounds of anti-depressive activity are preferably administered in the form of pharmaceutical preparations which contain the active substance together with a pharmaceutical organic or inorganic, solid or liquid, excipient suitable for enteral or parenteral application. Possible excipients are, for example, water, gelatine, sugars, such as glucose, lactose or fructose, starches, such as corn starch, rice starch or wheat starch, colloidal silica, stearic acid or its salts, such as magnesium stearate or calcium stearate, talc, vegetable oils, rubber, polyalkylene glycols or any other known fillers, disintegrating agents and/or lubricants. The preparations may, for example, be in the form of tablets, dragees, powders or suppositories, or in a liquid form e.g. as solutions, suspensions or emulsions. They are optionally sterilised and/or contain adjuvants such as preservatives, stabilisers, wetting agents or emulsifying agents, salts for controlling the osmotic pressure or buffers, as well as dyestuffs or flavoring agents. They may optionally also contain other therapeutically valuable substances and are formulated by per se known methods.

The following examples illustrate the invention without limiting it. The temperatures are given in degrees centigrade.

EXAMPLE 1

A solution of 5 g. of 4-chlorothiophenol in 50 ml. of methanol is treated dropwise with 2 ml. of 1,2-propyleneimine. When addition is complete, the reaction mixture is allowed to stand for 20 minutes at room temperature and the reaction product, which contains the 1-(4-chlorophenyl-mercapto)-2-propylamine is treated dropwise with concentrated hydrochloric acid until pH 4 is reached, the temperature being kept below 30° by cooling. After evaporation to one-third of its volume, the mixture is treated with ether until it begins to cloud. The 1-(4-chlorophenylmercapto)-2-propylamine hydrochloride of formula

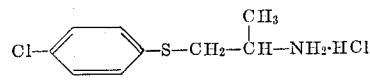

crystallises slowly and is filtered off; after washing with dry ether and recrystallisation from a mixture of methanol and ether, the product melts at 153°. The free base may be obtained by treating the above salt with an alkaline reagent, such as sodium hydroxide.

EXAMPLE 2

Tablets containing 0.02 g. of active substance are produced as follows:

| Constituents (for 1000 tablets)— | G. |
|---|---|
| 1-(4-chlorophenyl)-mercapto-2-propylamine hydrochloride | 20 |
| Corn starch | 160 |
| Talc | 14 |
| Magnesium stearate | 6 |
| Distilled water, q.s. | |

The 1-(4-chlorophenyl)-mercapto-2-propylamine hydrochloride and 130 g. of the corn starch are thoroughly mixed with one another and treated with a paste prepared from 30 g. of corn starch and 100 g. of distilled water. The mass is thoroughly kneaded, granulated, and dried at 45°. The mixture of the talc and the magnesium stearate is added to the granules and thoroughly mixed therewith. The product is converted into tablets weighing 0.2 g.

Tablets containing 0.05 g. of active substance are obtained by converting the mass described above into tablets weighing 0.5 g. (for 400 tablets).

EXAMPLE 3

A solution of 50 g. of 1-(4-chlorophenyl)-mercapto-2-propylamine hydrochloride in distilled water is diluted with distilled water to a volume of 5000 ml. and filtered through a sintered glass filter. The clear filtrate is dispensed in 1 ml., 2 ml. or 5 ml. quantities in glass ampoules, which are sealed and sterilised in an autoclave at 120° for ½ hour.

In order to treat depressive conditions, daily dosages of preferably about 0.02 g. to about 0.2 g., especially about 0.05 g. to about 0.15 g., of the active substance are administered enterally, for example, orally, and daily dosages of about 0.01 g. to about 0.05 g. are employed parenterally, for example, intramuscularly.

The pharmaceutical preparations as used, for example, in treating depressive conditions, are characterized by a therapeutically effective amount, especially by a content of about 0.01 g. to about 0.1 g., preferably of about 0.02 g. to about 0.05 g. per unit dose, of the 1-(4-chlorophenyl)-mercapto-2-propylamine or a pharmaceutically useful acid addition salt thereof, together with a pharmaceutically acceptable excipient.

I claim:
1. 1-(4-chloro-phenyl)-mercapto-2-propylamine.
2. The compound of claim 1 in the form of an acid addition salt thereof.
3. The compound of claim 1 in the form of a pharmaceutically acceptable acid addition salt thereof.
4. The compound of claim 1 in the form of its addition salt with hydrochloric acid.

References Cited

UNITED STATES PATENTS

| 2,769,839 | 11/1956 | Fincke | 260—570.5 |
| 3,221,054 | 11/1965 | Arnold et al. | 260—570.7 |
| 3,235,597 | 2/1966 | Mills et al. | 260—570.5 |
| 3,156,725 | 11/1964 | Kaiser et al. | 260—570.5 |

FOREIGN PATENTS

| 653,101 | 9/1964 | Belgium. |

OTHER REFERENCES

Suter et al.: "Ann.," vol. 576, pp. 215–222 (1952).

ROBERT V. HINES, Primary Examiner

U.S. Cl. X.R.

260—295.5, 311, 326, 343.7, 349, 429, 453, 454, 456, 470, 501.1, 501.12, 501.21, 516, 552, 553, 556, 558, 562, 566, 567.5, 592, 609; 424—330, 280, 266